Patented May 5, 1931

1,803,657

UNITED STATES PATENT OFFICE

ALFRED SIEGEL, OF NEWARK, NEW JERSEY, ASSIGNOR, BY MESNE ASSIGNMENTS, TO THE GRASSELLI CHEMICAL COMPANY, OF WILMINGTON, DELAWARE, A CORPORATION OF DELAWARE

AZO DYESTUFFS AND METHOD FOR THEIR PREPARATION

No Drawing.     Application filed March 2, 1926.   Serial No. 91,812.

This invention relates to an improvement in the preparation of azo dyestuffs from the arylamids. More specifically the invention is concerned with a novel method for effecting the combination of diazo compounds of the benzene and naphthalene series with the arylamids of 2.3 hydroxynaphthoic acid whereby a superior product particularly suited for the manufacture of pigment colors is obtained.

Prior to the process of this invention the coupling of the arylamids with diazo compounds adapted to form therewith azo dyes has not yielded products of a uniform nature on a commercial basis. For instance, a product of varying tinctorial properties is produced by the known method for carrying out these couplings in which the diazo compound is delivered into a suspension of the arylamid prepared by dissolving the latter compound in dilute caustic soda and precipitating with dilute acetic acid or with hydrochloric acid in the presence of Turkey red oil. Similarly, also, the process in which the arylamid is dissolved or suspended in sodium hydroxide, to which Turkey red oil is added prior to the coupling, has proven unsatisfactory. Not only is there a lack of uniformity in the dyestuffs produced by these processes, but with the heavier arylamids, that is, those of higher molecular weight, the coupling reaction proceeds so slowly that the products are of little or no commercial value.

In explanation of these unsatisfactory results it may be noted that these preparations of the arylamids hitherto employed for coupling are not entirely true solutions, but are in part, suspensions in different degrees of dispersion. Apparently, it is because of the non-uniform dispersion that the reactions carried out with such preparations are rather difficult to control. Slight variations in the degree of dispersion are seemingly reflected in varying rates of the coupling reaction and in turn in varying properties of the pigment.

One object of the present invention, therefore, is to perfect a process whereby a uniform product with unvarying tinctorial properties will be produced.

Another object is to effect a combination between the heavy arylamids, as metanitranilide or alphanaphthylide, and the weaker diazo compounds as for example, diazo alphanaphthylamine.

In carrying the process of my invention into effect I first treat the arylamid with a hot and very concentrated solution of caustic soda. In general I employ approximately two moles of caustic soda to one mole of arylamid. The mixture is preferably stirred with continuous boiling until the arylamid is completely taken up in the liquid. The mass is then poured into a relatively large volume of water. If to the resulting mixture an auxiliary alkali, as soda ash, is added in sufficient quantity to neutralize the free acid developed in the coupling to follow, this latter reaction will proceed rapidly and to a satisfactory degree of completion. The addition of the auxiliary alkali may be made prior to the addition of the diazo compound or during the progress of the reaction.

In order to more precisely set forth the invention the following examples are furnished in illustration thereof. It will be understood that I am not limited to the specific conditions or particular reagents therein disclosed, the process being of general applicability to the arylamids of 2.3-hydroxynaphthoic acid.

*Example 1.*—To a boiling solution of 40 pounds of caustic soda in 40 gallons of water, 185 pounds of the metanitranilid of 2.3 hydroxynaphthoic acid is gradually added with constant stirring and continuous boiling. After the solution is completed, the charge is poured into a large volume of water in the coupling tub and finally brought to a volume of 900 gallons. The preparation is probably now in the form of a mixed true solution and colloidal solution of the arylamid. After a solution of 17 pounds of soda ash in 20 gallons of water has been added, and the temperature adjusted to 85–90° F., the diazo solution prepared from 75 pounds of metanitroparatoluidine ($CH_3 : NO_2 : NH_2 = 1 : 3 : 4$), 175 pounds muriatic acid 20° Bé., and 37½ pounds of sodium nitrite in a volume of 250 gallons is delivered into the above described solution of the arylamid during one hour. The coupling proceeds at essentially the same rate as the addition of the diazo. The dyestuff separates in very dark, red flocks. It is filtered, washed, and dried. The product is a very deep red pigment and has probably the following graphical formula:

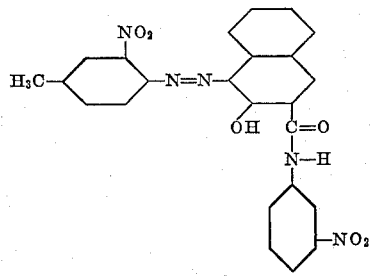

*Example 2.*—A solution of the metanitranilid of 2.3 hydroxynaphthoic acid is prepared exactly as described in Example 1 except that no soda ash is added. 71.5 pounds of alphanaphthylamine is added to 240 gallons of water containing 75 pounds of hydrochloric acid of 20° Bé.; this is heated to 160° F., cooled carefully by the addition of ice to 120° F. There is then added rapidly 75 pounds of sulphuric acid 66° Bé. followed by sufficient ice to cool to 32° F. With the temperature at 32° F., 37½ pounds of sodium nitrite is added very rapidly, and the charge stirred 20 minutes. This diazo solution is then added slowly to the above described solution of the arylamid with the temperature at 120° F. When approximately ½ of the diazo compound has been run in, there is added a solution of 62.5 pounds of soda ash in 30 gallons of water. The pigment dyestuff separates out in the form of very dark Bordeaux red flocks. It is filtered, pressed, and dried. The product is a deep Bordeaux red pigment.

*Example 3.*—71.5 pounds of alphanaphthylamine is diazotized exactly as described in Example 2. 158 pounds of the anilid of 2.3-hydroxynaphthoic acid is added to a boiling solution of 40 pounds of caustic soda in 30 gallons of water, and the charge boiled until it passes into solution. This is then run into a large volume of water in the coupling vat and finally made to a volume of 900 gallons. With the temperature at 120° F., the diazo compound is introduced slowly as in example 2, and when about ½ of it has been added, a solution of 62.5 pounds of soda ash in 30 gallons of water is run into the charge and coupling continued at the same rate. The pigment dyestuff separates in the form of dark bluish red flocks. It is filtered off, washed and dried. The product is a Bordeaux red pigment.

*Example 4.*—This coupling is prepared from diazo alphanaphthylamine and the alphanaphthalide of 2.3 hydroxynaphthoic acid. The conditions are exactly the same as in Example 3 except that 172 pounds of the alphanaphthalide are used in place of 158 pounds of the anilid of 2.3 hydroxynaphthoic acid. This product is a Bordeaux red pigment and has probably the following graphical formula:

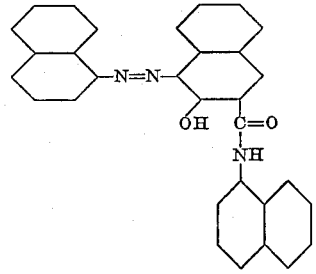

*Example 5.*—In this case the diazo compound from metanitroparatoluidine is prepared exactly as described under Example 1. A solution of the anilid of 2.3 hydroxynaphthoic acid is prepared exactly as is the solution of the metanitranilid in Example 1 except that 158 pounds instead of 185 pounds of arylamid are used. Coupling is carried out in exactly the same manner. The pigment dyestuff separates as bright, red flocks. It is filtered, washed and dried. The product is a bright bluish red pigment.

*Example 6.*—50 pounds of aminoazoxylene hydrochloride paste, is suspended in 24 gallons of water and diazotized by adding 20 pounds of 21° Bé. hydrochloric acid and 12 pounds of sodium nitrite at 32° F. A solution of 63 pounds of the metanitranilide of 2.3 hydroxynaphthoic acid is then prepared by dissolving in a boiling solution of 13½ pounds of caustic soda in 10 gallons water and running into a volume of 300 gallons of water to which is finally added a concentrated solution of 16¼ pounds of soda ash. The solution of the diazo compound is then run into the preparation of arylide at a temperature of 85 to 90° F. during a period of one hour. The product separates as dark, bluish red flocks. It is filtered, washed, and dried. The product is a dark Bordeaux pigment and has probably the following graphical formula:

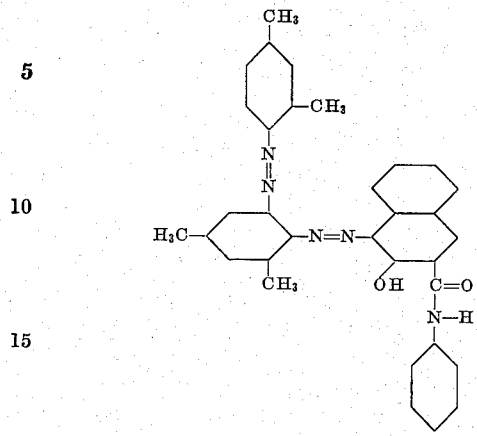

The arylamids, as already noted, when prepared for coupling according to my invention, are probably partially in true and partially in colloidal solution but with uniform dispersion. Probably due to the uniform dispersion, the coupling reaction proceeds at a more rapid and even rate than it has hitherto with the use of suspensions in different degrees of dispersion. Whatever the explanation, however, it is possible to obtain by the improved process a large number of products with superior and uniform tinctorial properties and a wide range of shades varying from orange through red to Bordeaux and of remarkable fastness to light.

With regard to the step of adding an auxiliary alkali to neutralize the acid developed during the coupling of the arylamid and the diazo compound, it will be obvious that, instead, the caustic alkali may be added initially in sufficient excess to effect such neutralization.

The dyestuffs which are products of my invention are particularly adapted for use as pigments in coating compositions as, for example, in pyroxylin lacquers.

I claim:

1. The method of preparing an arylamid of 2.3 hydroxynaphthoic acid for coupling, which comprises treating said compound with a hot concentrated solution of caustic soda to produce a homogeneous liquid mass and delivering the resulting mass into a relatively large volume of water.

2. The process as set forth in claim 1, in which the arylamid is an anilid of 2:3-hydroxy naphthoic acid.

3. The method of coupling an arylamid of 2.3 hydroxynaphthoic acid with a diazo compound adapted to form therewith an azo dye which comprises boiling the arylamid with a concentrated solution of caustic soda and pouring the resulting mass into a relatively large volume of water prior to the addition of a diazo compound.

4. The process as set forth in claim 3 in which the diazo compound is added to the arylamid in the presence of a quantity of sodium carbonate sufficient to neutralize acid developed during said coupling reaction.

5. The method of coupling an arylamid of 2.3 hydroxynaphthoic acid with a diazo compound adapted to form therewith an azo dye which comprises boiling approximately one mole of the arylamid with approximately two moles of sodium hydroxide, pouring the resulting mass into a relatively large volume of water and reacting the diazo compound with the diluted mass, said reaction being effected in the presence of a quantity of sodium carbonate sufficient to neutralize acid developed during said coupling reaction.

6. The process set forth in claim 5 in which the arylamid is a nitranilid of 2:3-hydroxy naphthoic acid and the diazo compound is diazo-alpha-naphthylamine.

7. The process of coupling the metanitranilid of 2.3 hydroxynaphthoic acid with a diazo compound adapted to form therewith an azo dye, which comprises boiling the arylamid with a concentrated solution of caustic soda and pouring the resulting mass into a relatively large volume of water prior to the addition of the diazo compound.

8. An azo dye having the uniform tinctorial properties of a compound resulting from coupling an arylamid of 2.3 hydroxynaphthoic acid with a diazo compound adapted to form therewith an azo dye, said alylamid having been boiled prior to said coupling with strong caustic soda and the resulting mass diluted in a large volume of water.

9. A dye of uniform tinctorial properties comprising the compound resulting from coupling diazo-alphanaphthylamine with an arylamid of 2:3-hydroxy-naphthoic acid, said arylamid having been heated prior to said coupling with a strong solution of a caustic alkali and the heated mass diluted in a large volume of water.

10. A dye compound of uniform tinctorial properties resulting from coupling the metanitranilide of 2.3 hydroxynaphthoic acid with a diazo compound adapted to form therewith an azo dye, said metanitranilide having been heated prior to said coupling with strong caustic soda and the resulting mass diluted in a large volume of water.

11. The method of preparing azo dyestuffs from an arylamid of 2:3-hydroxy naphthoic acid which comprises boiling the arylamid with a concentrated solution of caustic soda, diluting the resulting mass with a relatively large volume of water and adding to the diluted mass a diazo compound adapted to couple with the arylamid to form an azo dye.

12. The method of preparing azo dyestuffs from an arylamid of 2:3-hydroxy naphthoic acid which comprises boiling the arylamid with a concentrated solution of caustic soda, diluting the resulting mass with a relatively large volume of water and adding to the diluted mass a compound selected from the group consisting of diazo compounds of the benzene and naphthalene series.

13. The method of preparing azo dyestuffs from an arylamid of 2:3-hydroxy naphthoic acid which comprises boiling the arylamid with a concentrated solution of caustic soda, diluting the resulting mass with a relatively large volume of water and adding to the diluted mass a compound selected from the group consisting of diazo compounds of the benzene and naphthalene series and adapted to form with said arylamid a dye of the class consisting of monoazo and disazo dyes.

14. The process set forth in claim 13 in which the diazo compound is adapted to form with the arylamid a monoazo dye.

15. The process set forth in claim 6 in which the arylamid is the meta-nitranilid of 2.3:hydroxy-naphthoic acid and the diazo compound is diazo-meta-nitro-para-toluidine.

In testimony whereof I affix my signature.

ALFRED SIEGEL.

CERTIFICATE OF CORRECTION.

Patent No. 1,803,657.                                Granted May 5, 1931, to

ALFRED SIEGEL.

It is hereby certified that error appears in the printed specification of the above numbered patent requiring correction as follows: Page 4, line 19, claim 15, for the reference "claim 6" read claim 5; and that the said Letters Patent should be read with this correction therein that the same may conform to the record of the case in the Patent Office.

Signed and sealed this 30th day of June, A. D. 1931.

M. J. Moore,
(Seal)                                              Acting Commissioner of Patents.

CERTIFICATE OF CORRECTION.

Patent No. 1,803,657. Granted May 5, 1931, to

ALFRED SIEGEL.

It is hereby certified that the residence of the assignee in the above numbered patent was erroneously described and specified as "Wilmington, Delaware", whereas said residence should have been described and specified as Cleveland, Ohio, as shown by the records of assignments in this office; and that the said Letters Patent should be read with this correction therein that the same may conform to the record of the case in the Patent Office.

Signed and sealed this 18th day of August, A. D. 1931.

(Seal)

M. J. Moore,
Acting Commissioner of Patents.